United States Patent [19]

Talbott

[11] 4,267,782

[45] May 19, 1981

[54] PORTABLE, HAND-HELD DEVICE FOR FORMING CROP-RECEIVING CAVITIES IN THE GROUND

[76] Inventor: Gene B. Talbott, Box 173-D, Rte. 1, Banks, Oreg. 97106

[21] Appl. No.: 25,866

[22] Filed: Apr. 2, 1979

[51] Int. Cl.³ .................................. A01C 5/02
[52] U.S. Cl. .............................. 111/7.1; 111/89; 111/99; 239/287; 239/525; 248/80
[58] Field of Search ............ 111/89, 99, 6, 2, 7.1–7.4, 111/92; 239/276, 287, 273, 525, 526, 275, 285, 280; 248/75, 87, 76, 80; 175/67

[56] References Cited

U.S. PATENT DOCUMENTS

| 590,780 | 9/1897 | Travis | 239/286 X |
|---|---|---|---|
| 749,758 | 1/1904 | Templeton | 111/7.1 X |
| 952,092 | 3/1910 | Ashford | 111/7.1 X |
| 1,175,593 | 3/1916 | Brown | 111/7.1 X |
| 1,439,601 | 12/1922 | Boop | 111/92 X |
| 1,809,550 | 6/1931 | Farrar | 248/80 X |
| 2,792,257 | 5/1957 | Davis | 239/276 X |
| 3,227,408 | 1/1966 | Reed | 248/87 X |
| 4,095,746 | 6/1978 | Anderberg et al. | 239/287 X |

FOREIGN PATENT DOCUMENTS

| 798638 | 11/1968 | Canada | 111/7.1 X |
|---|---|---|---|
| 65130 | 11/1946 | Denmark | 111/99 X |

Primary Examiner—Steven A. Bratlie
Attorney, Agent, or Firm—Kolisch, Hartwell & Dickinson

[57] ABSTRACT

A portable, hand-held device for use in transplanting crops includes a tubular conduit operable for directing fluid outwardly from the discharge end thereof for impingement against the ground to form a crop-receiving cavity in the ground. Additionally, an orienting attachment connected to the tubular conduit is engageable with the ground for positioning the discharge end thereabove. The orienting attachment also includes a stabilizer for contacting a stretch of the ground to position the tubular conduit so that fluid may be discharged substantially vertically thereinto.

3 Claims, 2 Drawing Figures

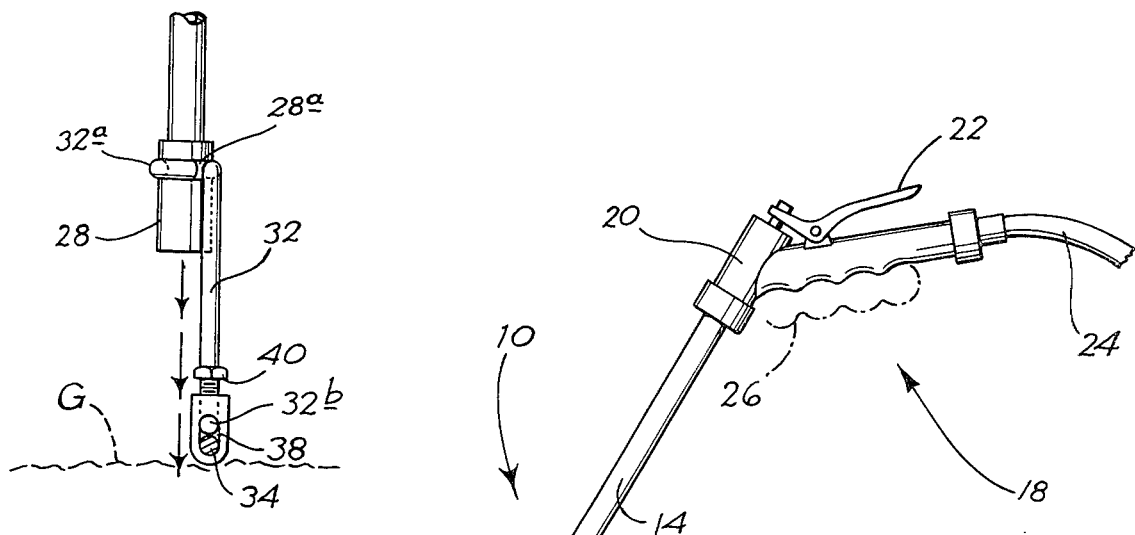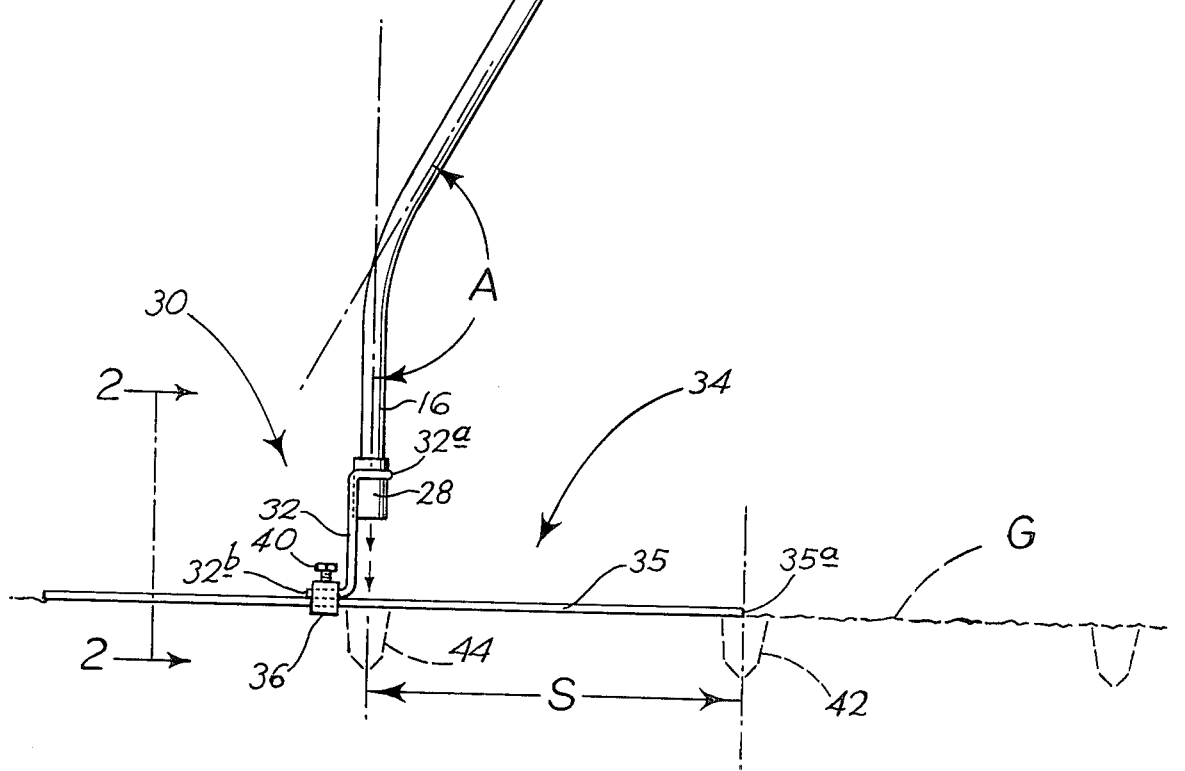

PORTABLE, HAND-HELD DEVICE FOR FORMING CROP-RECEIVING CAVITIES IN THE GROUND

BACKGROUND AND SUMMARY OF THE INVENTION

The present invention relates to transplanting devices, and more particularly to a novel portable, hand-held device operable for directing fluid, such as a liquid, against the ground to "drill" or form a crop-receiving cavity in the ground.

It has been found particularly advantageous to grow crops by means of transplanting. More specifically, certain row or vegetable crops such as cucumbers, tomatoes, celery, lettuce, squash, etc. may be initially grown in a greenhouse in a controlled environment. After predetermined growth has occurred, the crops, in seedling form, may be transported to a field and transplanted into the ground. Generally, commercial transplanting involves initially forming a crop-receiving trench in the ground by use of a mechanical digging apparatus. A seedling is then inserted into the ground and the apparatus is operated to pack soil around the seedling. Of course, mechanical apparatus are usually complicated, expensive and subject to malfunction.

Transplanting of crops in small-scale farms or in backyard gardens has also gained in popularity. The procedure is basically the same, i.e., to form crop-receiving cavities and insert transplants. While forming the cavities by use of a spade or other tool is common, it may be readily appreciated that such digging is time-consuming and wearisome. Also, depending upon the particular type of crop, a preselected spacing in a row is selected for the crop-receiving cavities. Small transplanting machines are now presently available on the market and may include some type of mechanism operable for digging or trenching crop-receiving cavities. However, such mechanisms generally are expensive and may not be suitable for use in small-scale agricultural production such as in a small farm or garden.

Accordingly, it is a general object of the present invention to provide a portable, hand-held device for use in transplanting crops which includes a tubular means operable for directing fluid outwardly from a discharge end thereof for impingement against the ground to "drill" a crop-receiving cavity. Connected to the tubular means is an orienting means engageable with the ground for positioning the discharge end above the ground. Thus, in operation, an individual manually positions the discharge end above the ground and directs fluid thereagainst for forming a crop-receiving cavity. Subsequently, the individual manually transports the tubular means to another location, such as along a predetermined crop row, and forms another crop-receiving cavity.

Additionally, it is another object of the present invention to provide a device for use in transplanting, as described above, which includes a stabilizing means for contacting a stretch of ground to thereby position the tubular means so that fluid may be discharged substantially vertically into the ground to form a crop-receiving cavity having a generally vertical axis. The stabilizing means preferably takes the form of an elongate member, such as a rod, which is mounted for contacting a stretch of the ground for providing stability to the tubular means.

Still another object of the present invention is to include adjustable means for permitting the elongate member to be shifted, in a preselected manner, so that the distance between the ends of the elongate member relative to the discharge end may be varied. Thus, it is possible to predetermine the distance between crop-receiving cavities by using the elongate member as a measure or gauge. Explaining further, after "drilling" a crop-receiving cavity, the tubular means with the elongate member connected thereto may be shifted forwardly (along a row) so that a rear end of the elongate member is positioned adjacent the crop-receiving cavity previously formed. A new crop-receiving cavity is formed and the tubular member advanced. It can be readily perceived that predetermined spacing between crop-receiving cavities is provided.

Still another object of the present invention is to provide a device, as described above, in which the tubular means includes first and second interconnected tubular portions having their longitudinal axes offset from one another. Such a construction enables an individual, manually transporting the tubular means, to hold same with one of the tubular portions having its longitudinal axis positioned substantially vertically relative to the ground as determined by the stabilizing means or elongate member. This position is achieved without the individual having to cock or otherwise twist the hand holding the tubular means. The result is a comfortable holding of the tubular means during formation of crop-receiving cavities in the ground.

These and additional objects and advantages of the present invention will become more readily appreciated from a consideration of the drawings and the detailed description of the preferred embodiment.

BRIEF DESCRIPTION OF THE DRAWINGS

FIG. 1 is a side elevation view of a portable, hand-held device including a tubular means for use in transplanting according to the present invention, shown positioned above the ground; and FIG. 2 is a sectional view taken along lines 2—2 of FIG. 1 illustrating interconnection of an orienting means to the tubular means.

DETAILED DESCRIPTION OF THE PREFERRED EMBODIMENT

As mentioned previously, it is a general object of the present invention to provide a portable, hand-held device for use in transplanting crops. To this end, a device, generally indicated at 10, is provided which includes a tubular means generally indicated at 12. As can be seen, tubular means 12 includes a first tubular portion 14 substantially rigidly interconnected to a second tubular portion 16 with the longitudinal axes of the tubular portions offset from one another. The axes are offset to form an oblique angle indicated at A. A handle, generally indicated at 18, includes a coupling 20 suitably connected to an end of first tubular portion 14 and is provided with a trigger or lever 22 for conducting fluid from a hose indicated at 24 into tubular means 12. Hose 24 is suitably connected to a supply of fluid, such as water, which may originate from a tap or a pressurized container carried by an individual. An individual's hand is partially shown in phantom lines indicated at 26.

Considering second tubular portion 16, it can be seen that it is provided with a nozzle 28 adjacent its discharge end. Further, an orienting means is generally indicated at 30 and includes a first member 32 mounted with its longitudinal axis substantially parallel to the longitudinal axis of second tubular portion 16. First member 32 includes a curved portion 32a (see FIG. 2) which is mounted in an accommodating groove 28a provided on nozzle 28. Curved portion 32a may be suitably snapped into engagement with the nozzle so a rigid interconnection between first member 32 and the nozzle is provided. As can be seen from a consideration of FIG. 1, first member 32 is connected to second tubular portion 16 and is engageable with the ground so that it extends beyond the discharge end for positioning the discharge end above the ground, indicated at G.

Additionally, it is to be noted that orienting means 30 also includes a stabilizing means, generally indicated at 34, which is connected to first member 32 by means of an adjustable means such as coupling 36. It is to be noted that stabilizing means 34, which is preferably formed as an elongate member 35, is positionable for contacting, along its length, a stretch of ground to position tubular means 12 so that liquid may be discharged substantially vertically into the ground.

Considering details of coupling 36 (see FIG. 2) it can be seen that it includes an opening 38 for receiving a portion 32b of first member 32 above elongate member 35 which is also slidably received in the opening. A suitable clamping mechanism, such as a threaded screw 40, is operable for displacement through a threaded aperture in the coupling for contacting portion 32b and urging it against elongate member 35. As can be readily appreciated, by suitably loosening screw 40 and shifting the elongate member, relative to nozzle 28, the distance between the ends of elongate member 35 relative to the discharge end of tubular means 12 may be preselected and fixed. The importance of this feature will be described during an explanation of the operation of device 10.

Returning to FIG. 2, it can be seen that first member 32 is positioned alongside nozzle 28 in an offset manner so that liquid, when it is vertically and downwardly discharged, will not contact elongate member 35. Additionally, it is to be noted that elongate member 35 is mounted so that its longitudinal axis is substantially perpendicular to the longitudinal axis of first member 32 as well as to the longitudinal axis of second tubular portion 16. As mentioned previously, elongate member 35 is shiftable relative to second tubular portion 16.

With respect to the selection of oblique angle A between the longitudinal axes of first tubular portion 14 and second tubular portion 16, such is dictated by a consideration of comfort for an individual using device 10. More specifically, during operation, it is contemplated that an individual will grip handle 18 and with elongate member 35 contacting a stretch of ground, the longitudinal axis of second tubular portion 16 should be substantially vertical relative to the ground so that liquid directed thereinto will form a substantially vertical cavity. In this connection, it is necessary that the angularity between the longitudinal axes of the tubular portions be predetermined so that an individual need not cock or otherwise twist his hand. Rather, a natural orientation of the hand is sought during movement of device 10 along a row, as it is contemplated that an individual will position elongate member 35 against the ground, direct fluid thereinto (by suitably depressing lever 22) for forming a crop-receiving cavity. The device is then lifted off the ground for subsequent transport down the row. Generally, it is contemplated that the individual's hand should not have to be twisted and suitable angles between the longitudinal axes of first and second tubular portions 14, 16 respectively have been found to lie generally in the range of 120° to 170°.

Generally describing use of the device of the present invention, it is initially assumed that handle 18 is connected to hose 24 so that a fluid, such as water, may be selectively directed through the handle and into tubular means 12 by suitable actuation of lever 22. Depending upon the spacing between transplants, the distance between an end of elongate member 35, such as end 35a is predetermined with respect to the discharge end of second tubular portion 16 or nozzle 28. By appropriately loosening screw 40 and shifting elongate member 35 through coupling 36 to a preselected position, a measure or gauge is provided for determining spacing between crop-receiving cavities which are to be formed. More specifically, as an individual walks along ground G, nozzle 28 is positioned above a preselected location and lever 22 is actuated for directing liquid outwardly and downwardly from the discharge end of second tubular portion 16 (through nozzle 28) for impingement against the ground to "drill" and form a crop-receiving cavity. Such a cavity is indicated in the phantom lines shown at 42. Next, assuming that a preselected spacing of say, S has been predetermined, tubular means 12 is lifted and moved along the row until end 35a is positioned adjacent cavity 42. Lever 22 is then depressed for permitting liquid to be directed vertically downwardly through nozzle 28 to form cavity 44. Seedlings may then be inserted and the process is continually repeated until a predetermined number of crop-receiving cavities are formed along a preselected row with a substantially predetermined spacing between the cavities.

From the above description, it can be seen that device 10, for use in transplanting crops, includes several important features and advantages. First of all, it can be seen that an extremely simple aid to transplanting is provided for drilling or digging cavities into the ground by means of injecting a jet of water. No complicated mechanical mechanisms are required, and of course, the need for stooping and using a space or other digging tool is eliminated.

Additionally, tubular means 12 provided with first and second tubular portions 14, 16 respectively, having their longitudinal axes offset, permits an individual a high degree of hand comfort in moving device 10. Further, it can be seen that orienting means 30 not only vertically positions a discharge end, such as nozzle 28 above the ground, but by means of stabilizing means 34 also orients second tubular portion 16 with its longitudinal axis substantially vertical to the ground. Stabilizing means 34, which includes elongate rod 35 selectively shiftable relative to first member 32, enables the use of a measure or gauge to insure substantially preselected spacing between crop-receiving cavities.

Still another advantage of the present invention resides in the simplicity of the adjusting means, such as coupling 36 which receives first member 32 and elongate member 35 and frictionally clamps, by means of screw 40, the members together.

It is contemplated that tubular means 12 is preferably constructed of a substantially rigid plastic material, such as polyvinylchloride (PVC) but any substantially rigid and light-weight material may be advantageously employed.

While the invention has been particulaly shown and described with reference to the foregoing preferred embodiments thereof, it will be understood by those skilled in the art that other changes in form or detail may be made without deparing from the spirit or scope of the invention as defined in the independent claims.

It is claimed and desired to secure by Letters Patent:

1. Portable, hand-held device for use in transplanting crops comprising:
    a handle for gripping by an individual adapted for connection to a supply of fluid;
    substantially rigid tubular means including a first tubular portion extending from said handle and a second tubular portion extending from said first tubular portion, said first and second tubular portions having their longitudinal axis offset from one another;
    a nozzle mounted on a discharge end of said second tubular portion for directing fluid outwardly therefrom so that the fluid will impinge against the ground to form a crop receiving cavity in the ground;
    orienting means connected to said tubular means adjacent said discharge end including a first member extending beneath said discharge end and generally parallel to the longitudinal axis of said second tubular portion and a stabilizing means comprising an elongate member secured to said first member, said elongate member being positionable along its length against the ground to orient said tubular means and said nozzle above the ground so that fluid may be discharged substantially vertically into the ground; and
    adjustable means interconnecting said first member and said elongate member operable for preselecting and fixing the distance between the ends of said elongate member relative to said discharge end.

2. The device of claim 1 wherein said elongate member is connected to said first member substantially perpendicularly thereto.

3. The device of claim 1 wherein said first and second tubular portions are disposed relative to one another so that their longitudinal axes define an angle generally within the range of 120° to 170°.

* * * * *